US011680856B2

(12) United States Patent
Vergauwen et al.

(10) Patent No.: US 11,680,856 B2
(45) Date of Patent: Jun. 20, 2023

(54) DUAL PRESSURE SENSOR WITH IMPROVED DISTURBANCE DETECTION

(71) Applicant: Melexis Technologies NV, Tessenderlo (BE)

(72) Inventors: Johan Vergauwen, Tessenderlo (BE); Ben Maes, Tessenderlo (BE); Maliheh Ramezani, Tessenderlo (BE); Appolonius Jacobus Van Der Wiel, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 17/518,746

(22) Filed: Nov. 4, 2021

(65) Prior Publication Data

US 2022/0136915 A1    May 5, 2022

(30) Foreign Application Priority Data

Nov. 5, 2020  (EP) .................................... 20206061

(51) Int. Cl.
*G01L 1/22*    (2006.01)
(52) U.S. Cl.
CPC .......... *G01L 1/2268* (2013.01); *G01L 1/2293* (2013.01)
(58) Field of Classification Search
None
See application file for complete search history.

(56) References Cited

U.S. PATENT DOCUMENTS

| | | | | |
|---|---|---|---|---|
| 4,765,184 A | * | 8/1988 | Delatorre | ............. G01D 5/2417 327/516 |
| 2013/0152696 A1 | * | 6/2013 | Kalz | .................... G01L 19/0092 73/777 |
| 2013/0247676 A1 | * | 9/2013 | Uchiyama | ................ G01L 13/02 73/717 |
| 2013/0247677 A1 | * | 9/2013 | Uchiyama | ................ G01L 13/02 73/717 |
| 2016/0169738 A1 | * | 6/2016 | Van Der Wiel | .......... G01J 5/024 250/338.4 |
| 2019/0064026 A1 | * | 2/2019 | Kollmitzer | ................. G01L 9/06 |

FOREIGN PATENT DOCUMENTS

| | | |
|---|---|---|
| EP | 3109658 A1 | 12/2016 |
| WO | 9801731 A1 | 1/1998 |

OTHER PUBLICATIONS

Extended Search Report from corresponding EP Application No. 20206061.2, dated Apr. 21, 2021.

\* cited by examiner

*Primary Examiner* — Lisa M Caputo
*Assistant Examiner* — Nigel H Plumb
(74) *Attorney, Agent, or Firm* — Workman Nydegger

(57) ABSTRACT

A controller configured for detecting a disturbance using a comparison of outputs of at least two sensors and for determining a pressure from the outputs of the at least two sensors. A ratio of the measurement sensitivity and the disturbance sensitivity should be different for the at least two sensors. A method for monitoring disturbances of a sensor assembly includes comparing the outputs of the at least two sensors. The controller and related method provide, while requiring only two sensors, a redundant system that is also able to detect excessive disturbances on a sensor assembly.

15 Claims, 5 Drawing Sheets

DUAL PRESSURE SENSOR WITH IMPROVED DISTURBANCE DETECTION

FIELD OF THE INVENTION

The invention relates to the field of pressure sensors. More specifically it relates to a sensor system and a controller configured for monitoring disturbances of a pressure sensor assembly.

BACKGROUND OF THE INVENTION

Pressure sensors may comprise a plurality of elements, such as for example stress sensitive elements or strain sensitive elements, which are organized on a membrane. When the membrane deflects due to a change in pressure difference between both sides of the membrane, this may result in a resistivity change of the sensitive elements. This change may lead to a change of the signal of the pressure sensor which can be used as an indication of the pressure difference between both sides of the membrane.

Such pressure sensors may be used in safety critical applications such as for example in automotive applications. Automotive Safety Integrity Level (ASIL) is a risk classification scheme defined by the ISO 26262—Functional Safety for Road Vehicles standard. In this standard different levels are defined. ASIL-D represents the highest degree of automotive hazard and highest degree of rigor applied in the assurance of the resultant safety requirements. The functional safety metrics are calculated in the FMEDA (Failure Modes, Effects, and Diagnostic Analysis) for each system.

Two sensors are required to make an ASIL-D integrated pressure sensor. Redundancy is a key concept to improve functional safety, but it might not be enough, especially to reach ASIL-D, due to common cause failures.

Disturbances may, however, also influence the operation of pressure sensors. These disturbances may have a variety of causes. It is known from simulations and measurements that change of stress (e.g. due to packaging stress) is the most important drift factor for MEMS pressure sensors. If, for example, 2 pressure sensors are implemented on the same die, then they could both drift in a similar way due to package stress (even if they are using 2 different membranes).

One way to solve this problem is to use 2 different dies, but that adds cost and complexity and might even not help enough, especially when both sensors are in the same package.

In the prior art different solutions are proposed:
- duplicate sensors, both on the same substrate (e.g., same die in case of MEMS)
- duplicate sensors on 2 different dies (identical sensors may be used)
- two different sensors wherein the sensors are using two different measurement principles (e.g., resistive and capacitive sensor).

However, the first (and potentially also the second) solution is not good enough for the highest ASIL ratings. Especially when a disturbance is causing a drift of both sensors this may be unnoticed in such a configuration. The second and third solutions are expensive and add packaging complexity.

There is therefore a need for sensor systems and controllers configured for detecting disturbances in the operation of a sensor assembly of pressure sensors.

SUMMARY OF THE INVENTION

It is an object of embodiments of the present invention to provide good sensor systems and controllers for detecting disturbances in the operation of a sensor assembly of pressure sensors.

The above objective is accomplished by a method and device according to the present invention.

In a first aspect embodiments of the present invention relate to a controller configured for monitoring disturbances of a pressure sensor assembly. The pressure sensor assembly comprises at least two sensors. The sensors are configured for measuring a pressure and the at least two sensors have a sensor dependent measurement sensitivity Sm for the pressure, and at least one of the sensors is sensitive for a disturbance with a sensor dependent disturbance sensitivity Sd, wherein a ratio Sm/Sd of the measurement sensitivity and the disturbance sensitivity is different for at least two sensors. The controller is configured for detecting the disturbance by comparing outputs of the at least two sensors.

It is an advantage of embodiments of the present invention that, when using sensors with differing Sm/Sd, the influence of the disturbance on the outputs of the sensors will be different from sensor to sensor. Thus, it is possible to determine when the disturbance is impacting the sensor assembly so much that reliable measurements of the pressure are not possible. The disturbance may for example be detected when the difference between the outputs is exceeding a predefined threshold.

The disturbance may for example be caused by stress in the package of the sensor assembly. The invention is, however, not limited thereto. Other causes, such as charges or leakage currents may also be disturbances affecting the pressure measurement. The invention can be applied to monitor disturbances as long as pressure sensors with differing sensitivity ratios are used.

In a second aspect embodiments of the present invention relate to a sensor system for measuring a pressure. The sensor system comprises a pressure sensor assembly and a controller.

The pressure sensor assembly comprises at least two sensors. The sensors are configured for measuring the pressure and each sensor has a sensor dependent measurement sensitivity Sm for the pressure, and at least one of the sensors is sensitive for a disturbance with a sensor dependent disturbance sensitivity Sd. A ratio Sm/Sd of the measurement sensitivity and the disturbance sensitivity is different for at least two sensors.

The controller is a controller in accordance with embodiments of the present invention and is configured for monitoring disturbances of the pressure sensor assembly by comparing outputs of the at least two sensors.

In a third aspect embodiments of the present invention relate to a method for monitoring disturbances of a sensor assembly. The method comprises:
  measuring an output of at least two sensors, wherein the sensors are configured for measuring a pressure and wherein the at least two sensors have a sensor dependent measurement sensitivity Sm for the pressure, and at least one of the sensors is sensitive for a disturbance with a sensor dependent disturbance sensitivity Sd, wherein a ratio Sm/Sd of the measurement sensitivity and the disturbance sensitivity is different for at least two sensors, detecting the disturbance by comparing the output of the at least two sensors.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
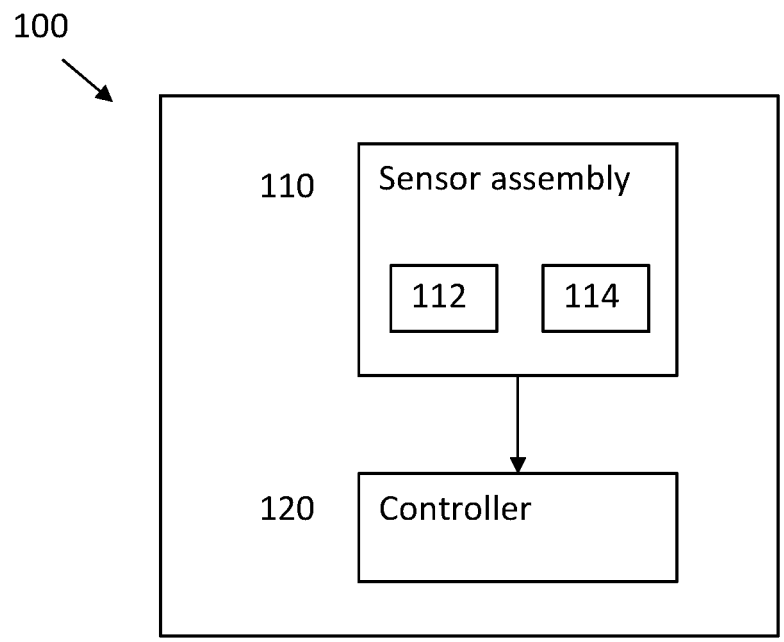
FIG. 1 shows a schematic drawing of the sensor system in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a controller 120 configured for monitoring disturbances of a pressure sensor assembly 110.

The pressure sensor assembly 110 comprises at least two sensors 112, 114. These sensors 112, 114 are configured for measuring a pressure. Each pressure sensor has its own measurement sensitivity Sm for the pressure, and at least one of the sensors 112, 114 is sensitive for a disturbance with a sensor dependent disturbance sensitivity Sd. The ratio Sm/Sd of the measurement sensitivity and the disturbance sensitivity is different for at least two sensors (112, 114). When a sensor is not sensitive or almost insensitive for the disturbance this implies that the disturbance sensitivity Sd is equal or close to zero.

The controller 120 is configured for detecting the disturbance by comparing the outputs of the at least two sensors.

In embodiments of the present invention the controller may be configured for scaling the outputs of the sensors such that the scaled outputs with respect to the same pressure are equal in the absence of a disturbance, such that sensitivity Sm for the pressure is the same for both sensors. As the ratio Sm/Sd is different between the sensors, the scaled outputs will have a different output level in the presence of a disturbance. Hence, the impact of the disturbance can be determined by comparing the difference between the scaled outputs of the sensors. The difference of the scaled outputs may for example be compared with a threshold. In this example the outputs are scaled. Other algorithms may, however, be used in order to determine the impact of the disturbance on the measurements. This is possible because the ratio Sm/Sd differs between the sensors.

If the ratio Sm/Sd would be the same, simply duplicating the sensors would not be sufficient for safety critical applications. In that case it would not be possible to distinguish a change in the output signals caused by a pressure change from a change in the output signals caused by a change in the disturbance.

It is an advantage of embodiments of the present invention that the ratio of the pressure sensitivity versus the disturbance sensitivity (e.g., sensitivity to package stress) is different for both sensors. In that case the disturbance will have a different impact on both sensors. Therefore, it is possible to detect the presence of such a disturbance. Hence, it is also possible to detect excessive influence of the disturbance by comparing the result of both sensors. If, for example, the difference of the (scaled) outputs of both sensors is exceeding a threshold, then it can be reported by the controller 120 as a safety issue. The threshold may for example be a predefined threshold. The threshold may be selected depending on the safety requirements (e.g., depending on the ASIL-D requirements).

Scaling of the outputs may be done such that the influence of the pressure on the scaled outputs is the same for both sensors. For example, a first sensor may have a pressure sensitivity Sm1 and a disturbance sensitivity Sd1, and a second sensor may have a pressure sensitivity Sm2 and a disturbance sensitivity Sd2. Sm1 may for example be substantially the same as 2Sm2 and Sd1 may for example be substantially the same as Sd2. The difference (Odiff) of the scaled outputs may be obtained as follows (with P a measure for the pressure and D a measure for the disturbance):

$$Odiff=(P*Sm1+D*Sd1)-2*(P*Sm2+D*Sd2)=(D*Sd1-2*D*Sd1)=-D*Sd1$$

If the sensor dependent measurement sensitivities are the same, then no scaling is required (i.e., scaling with scale factor 1).

In a second aspect embodiments of the present invention relate to a sensor system 100 for measuring a pressure. The system is, moreover, configured for monitoring disturbances in the operation of the system. The sensor system 100 comprises a pressure sensor assembly 110, and a controller 120 in accordance with embodiments of the present invention. The pressure sensor assembly 110 comprises at least two sensors 112, 114. The sensors 112, 114 are configured for measuring the pressure. Each sensor 112, 114 has a sensor dependent measurement sensitivity Sm for the pressure, and at least one of the sensors is sensitive for a disturbance with a sensor dependent disturbance sensitivity Sd. The ratio Sm/Sd of the measurement sensitivity and the disturbance sensitivity is, moreover, different for at least two of the sensors 112, 114. The controller 120 is configured for measuring monitoring disturbances of the pressure sensor assembly 110.

In embodiments of the present invention the absolute value of the ratio Sm/Sd of one sensor may for example be more than a factor of 1.5 or even more than a factor of 2 (e.g., Sd1=Sd2 and Sm1=2*Sm2) or even more than a factor of 5 (e.g., Sm1=2*Sm2 and Sd1>10*Sd2) bigger than the absolute value of the ratio Sm/Sd of another sensor. In some embodiments of the present invention the absolute value of the ratio of one sensor may even be the same as the absolute value of the ratio of another sensor, if both ratios have a different sign (e.g., Sm1=−Sm2 and Sd1=Sd2).

In embodiments of the present invention at least some of the sensors 112, 114 may be provided on a membrane 118. This membrane may for example have a circular, rectangular, or square shape. The invention is, however, not limited to these shapes. In some embodiments of the present invention the sensors may be present on the same membrane. In other embodiments of the present invention at least some of the sensors 112, 114 may be present on a first membrane and some of the sensors 112, 114 may be present on a second membrane.

The measured pressure may for example be the pressure difference between the one side of the membrane and the other side of the membrane. In order to measure an absolute pressure, a cavity with a vacuum or a known pressure may be present on one side of the membrane.

In some embodiments of the present invention the membrane is a circular membrane. In some embodiments of the present invention the membrane is a square or rectangular membrane.

In embodiments of the present invention the sensors are using the same sensing principle. The sensors may for example be stress sensors, strain sensors, or force sensors. Such sensors may for example be provided on a membrane for measuring a pressure on the membrane. The sensors may for example be piezo-resistors provided on a membrane.

In embodiments of the present invention the sensor assembly may be a microelectromechanical system (MEMS). In such a sensor electronic components (such as readout circuitry and processing electronics) and mechanical components (such as a membrane on which a stress, strain, or force sensor is mounted) may be present on the same semiconductor substrate. The semiconductor substrate may for example be a silicon substrate. Thus, a single chip or a plurality of chips may be obtained. This single chip or plurality of chips may be assembled in a package.

From simulations and measurements, the inventors have found that the change of stress (e.g., due to packaging stress) is the most important drift factor for MEMS pressure sensors.

In embodiments of the present invention the sensors 112, 114 may have a different sensitivity for pressure. In embodiments of the present invention at least one sensor 112, 114 may be substantially insensitive to the disturbance. In embodiments of the present invention the sensors may for example be stress sensors, strain sensors, or force sensors which are substantially insensitive by known disturbance factors.

In embodiments of the present invention the sensitivity ratio is changed by changing the position of the sensor on the membrane.

Although it is not obvious to change the position of one of the sensors to a less optimal position, it is found by the inventors that by doing so a system can be obtained which allows to determine whether disturbances, such as package stress, are impacting the sensor assembly so much that reliable measurements of the pressure are not possible anymore. Moreover, in embodiments of the present invention, both sensors, are used for measuring the pressure. Hence, using only two pressure sensors, a redundant system can be obtained, which is also able to detect excessive disturbances (such as package stress) on the sensor assembly.

Changing the position of the sensor on the membrane may for example mainly change the pressure sensitivity, while it may not, or to a lesser extent, change the sensitivity of the sensor to disturbances such as the influence of package stress.

As will be illustrated below, in other exemplary embodiments the influence of external disturbances, e.g., the package stress, are an order of magnitude reduced while the pressure sensitivity is only reduced by a smaller factor such as for example a factor of 2.

In some embodiments of the present invention the sensors may be present on the same substrate. This is, however, not strictly required. When having them on the same substrate, a less expensive sensor system may be obtained than when having them on a different substrate.

Figure 2:
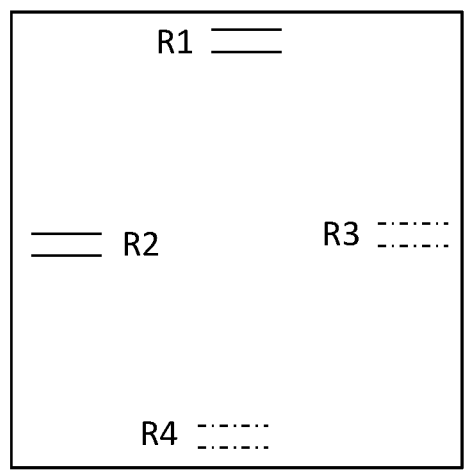
FIG. 2 shows a schematic drawing of a pressure sensor assembly on a membrane.
Figure 3:
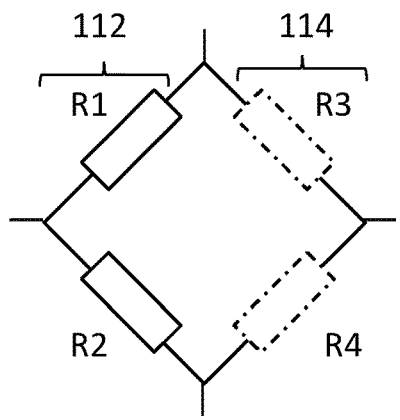
FIG. 3 shows a schematic drawing of pressure sensors in a Wheatstone bridge configuration.

A prior art pressure sensor may comprise a plurality of resistors R1, R2, R3, R4 on a membrane. An example thereof is illustrated in FIG. 2. In this example each resistor R1, R2, R3, and R4 is configured as a series connection of 2 resistors (symbolically represented by the parallel lines on the membrane; these parallel lines indicate a position on the membrane). These resistors may be configured in a Wheatstone bridge configuration such as illustrated in FIG. 3. The resistors R1 and R2 are connected in series and form one branch between a top node and a bottom node, and the resistors R3 and R4 are connected in series and form another branch between the top node and the bottom node. The node between R1 and R2 is referred to as the left node and the node between R3 and R4 is referred to as the right node. Typically, a voltage is supplied between top and bottom node of the bridge and a voltage difference is measured between the left and the right node. The voltage difference is dependent on the pressure difference between both sides of the membrane. Instead of applying a voltage, also a current may be applied between two nodes. Similarly, instead of measuring a voltage, a current may be measured.

Figure 4:
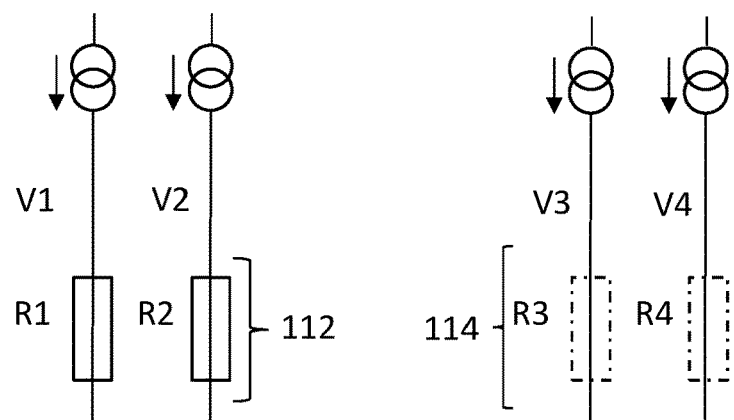
FIG. 4 shows a schematic drawing of pressure sensors which are configured as two half bridges to generate two differential outputs.

An example of a Wheatstone bridge configuration is shown in FIG. 3, showing a full Wheatstone bridge. This bridge configuration can also be seen as two half bridges, each generating a single-ended voltage and representing one sensor. In embodiments of the present invention a first sensor 112 (represented by the solid lines) may comprise the resistors R1, R2 of a first half bridge and a second sensor 114 (represented by the dashed lines) may comprise the resistors R3 and R4 of a second half bridge. These half bridges can also be made differently like shown in FIG. 4. The dashed line in FIG. 4 represents an optional common node for all branches. The advantage of FIG. 4 is that two differential voltages are obtained (V1-V2, and V3-V4) which can be measured more accurately than two single-ended voltages.

In embodiments of the present invention the secondary half bridge is put at another location of the membrane such that it is less sensitive to pressure, but has a similar sensitivity to package stress.

Figure 5:
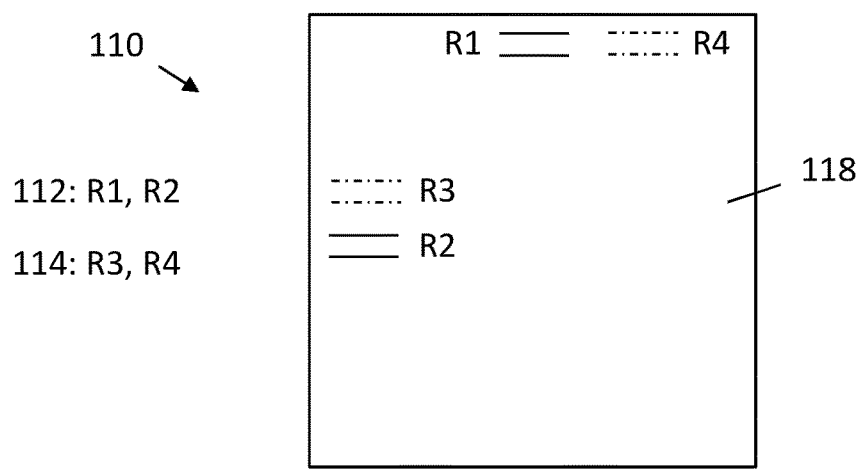
FIGS. 5 to 8 show schematic drawings of pressure sensor assemblies on a membrane, in accordance with embodiments of the present invention.

An exemplary embodiment thereof is illustrated in FIG. 5. In this example a first sensor 112 is comprising the resistors R1, R2 and a second sensor is comprising the resistors R3 and R4. Each resistor R1, R2, R3, and R4 is configured as a series connection of 2 resistors (symbolically represented by the parallel lines on the membrane, indicating that in the layout these resistors are substantially parallel). In this example the membrane is square or rectangular. In this example the resistors R1 and R2 are centered on a side of the membrane to have a first sensor with a maximum pressure sensitivity. The resistors R3 and R4 are off-center on a side of the membrane to obtain a second sensor with a reduced pressure sensitivity. By putting the resistor pairs not in the middle of a side of the membrane but nearby the resistors of the first sensor, the secondary half bridge formed by these sensors is less sensitive to pressure, but has a similar sensitivity to package stress.

Figure 6:
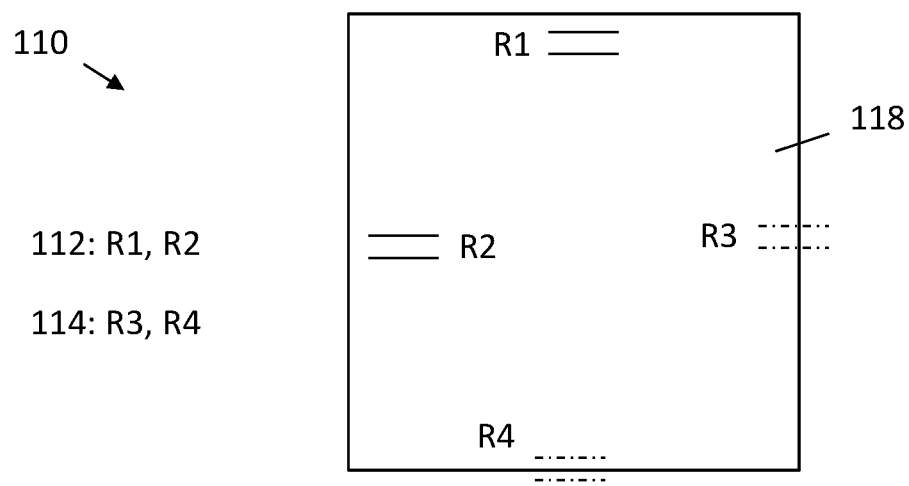

Another exemplary sensor configuration on a membrane, in accordance with embodiments of the present invention, is illustrated in FIG. 6. In this example a first sensor 112 comprises resistors R1 and R2, and a second sensor 114 comprises resistors R3, and R4. The membrane in this example is a square membrane. The invention is, however, not limited thereto and also, for example, a rectangular or circular membrane may be used. In these embodiments the resistors of the resistors R1, and R2 are present near the side of the membrane and completely on the membrane, and the resistors R3, and R4 are present partly on the membrane and partly outside the membrane. By putting the resistors of the secondary half bridge partially off the membrane, a less sensitive sensor to pressure is obtained, but this sensor has a similar sensitivity to package stress.

Figure 7:
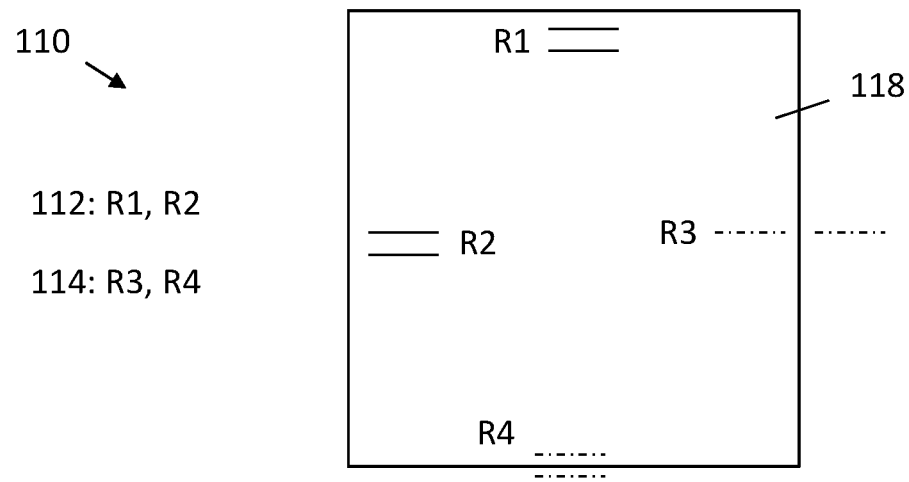

In the example illustrated in FIG. 7, the resistors R1 and R2 of the first sensor 112 are present near the sides and completely on the membrane, and for the resistor R3, and R4 one part of the resistor is present on the membrane and the other part of the resistor is present outside the membrane. In this example, each resistor R1, R2, R3, and R4 is configured as a series connection of 2 resistors (each time a first part and a second part; these parts are positioned in a substantially parallel layout on the membrane). In this example the resistors R1 and R2 are present on adjacent sides of the membrane, and the resistors R3 and R4 are present on different adjacent sides of the membrane. The invention is, however, not limited thereto. The resistors R2 and R3 may for example be positioned close together at the same side of the membrane. In embodiments of the present invention the membrane may be circular. In that case the resistors R1, R2, R3 and R4 may be neighboring resistors. In this example with resistors R3, R4 of the second sensor put partially off the membrane, the sensitivity to pressure of the second sensor is halved, but the second sensor has a similar sensitivity to package stress.

Figure 8:
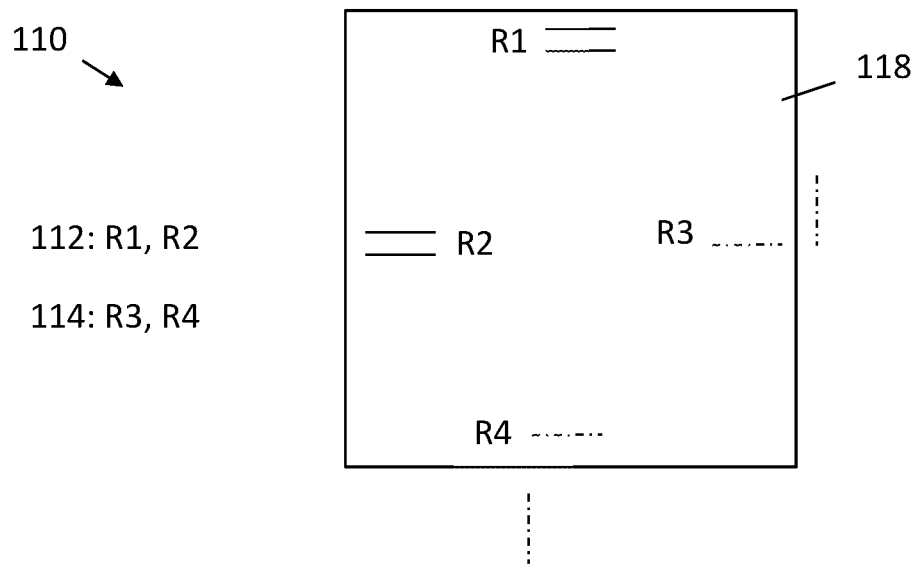

In the exemplary embodiment illustrated in FIG. 8 the first sensor comprises resistors R1 and R2 and the second sensor comprises resistors R3 and R4. Each resistor R1, R2, R3, and R4 is configured as a series connection of 2 resistors. The resistors of R1 are configured in a substantially parallel layout. The resistors of R2 are configured in a substantially parallel layout. The resistors of R3 are configured in a substantially orthogonal layout. The resistors of R4 are configured in a substantially orthogonal layout. In this example the membrane is square or rectangular but also a circular membrane could be used. The resistor R1 is present on one side of the membrane and the resistor R2 is present on a neighboring side of the membrane. The resistors R3 and R4 are also present on neighboring sides of the membrane. The resistors R1 and R2 are present near the side and completely on the membrane. For resistor R3 one resistor is present on the membrane and the other resistor is present outside the membrane, and also for resistor R4, one resistor is present on the membrane and the other resistor is present outside the membrane. Thus, also in this example the second sensor 114 is put partially off the membrane. In this example the sensitivity of the second sensor to the pressure is halved, but the sensitivity to package stress is reduced significantly more. The reason therefore is that the package stress is similar for both halves of the resistor, but both halves will change in opposite direction because of their orthogonal orientation.

In the examples above a controller, in accordance with embodiments of the present invention, is configured for detecting the disturbance (e.g., excessive package stress) by comparing outputs (e.g., V1-V2, and V3-V4) of the half bridges.

In the examples above two half-bridges or one full bridge could be used. The invention is, however, not limited thereto. Also, other configurations may be used to obtain a plurality of sensors with different sensitivity ratios. In some embodiments of the present invention for example two full bridges may be used.

In embodiments of the present invention the sensors are read-out using a read-out circuitry. This read-out circuitry may be shared between different sensors or different sensors may have a different read-out circuitry. The read-out circuitry may for example be configured for amplifying the output signal of the sensor. The output signal may for example be a voltage or a current. The read-out circuitry may for example comprise an amplifier (e.g., a low noise amplifier) for amplifying the output signal of the sensor. The read-out circuitry may be configured for digitizing the (amplified) signal of one or more sensors. The digitized outputs of the sensors may be compared by the controller for detecting the disturbance. This controller may for example be a microprocessor, a microcontroller, a field programmable gate array, or another kind of processing device.

As explained above, in embodiments of the present invention the controller is configured for detecting the disturbance by comparing outputs of the at least two sensors. The controller may, moreover, be configured for determining the pressure from the outputs of the sensors.

This may be achieved by using the sensor which has, by design, the highest Sm/Sd ratio and determining from this sensor the pressure. From the difference between the (scaled) outputs of both sensors a measure of the disturbance may be determined. This measure may be used to compensate, and thus obtain a pressure which is less sensitive to the disturbance. Hence, for cases where there is a known relationship between the different sensors it is possible to obtain a pressure with a significantly reduced impact of the disturbance when compared to a system which comprises only one pressure sensor.

If, by design, the sensitivity Sm1 of a first pressure sensor is similar to the sensitivity Sm2 of a second pressure sensor and the disturbance sensitivity Sd1 of the first pressure sensor has a similar magnitude but opposite sign compared to the disturbance sensitivity Sd2 of the second pressure sensor, then both sensor outputs can be averaged to get an output signal with a significantly reduced dependency on the disturbance.

In case of 3 pressure sensors for which it is unknown which sensor has the highest reliability, the output which results in a pressure between the pressures from the two other sensors, may be used for obtaining the pressure.

In embodiments of the present invention a calibration of the sensor system may be done. In that case the output signal of the pressure sensors may be measured for a plurality of pressures. Thus, the measurement sensitivity Sm of each pressure sensor can be defined. In embodiments of the present invention the measurement sensitivity may be accessible for the controller 120. Knowing the measurement sensitivity for each sensor allows the controller to scale the outputs such that the scaled outputs would be the same if no disturbance is affecting the measurement. The result of the difference between the scaled outputs is a measure for the disturbance. This difference may for example be compared with a threshold to determine whether or not the sensor system is still correctly operating. Scaling of the sensor outputs is not required if both sensors have the same measurement sensitivity.

In embodiments of the present invention the disturbance may be caused by charges in the pressure sensor assembly 110 or by leakage currents through the pressure sensor assembly 110.

Charges in the pressure sensor assembly may for example be mobile ions. Depending on the sensor configuration, more mobile ions may be present in one location of the sensor compared to another location. For example, in case of a Wheatstone bridge configuration more mobile ions may be present on the resistor closer to ground compared to the resistor closer to the supply voltage. In embodiments of the present invention the sensor system is configured for applying a supply voltage only part of the time for at least one of the two sensors 112, 114 such that the supply duration during which a voltage is applied is different for the at least two sensors 112, 114, in order to have a different sensitivity Sd, for the disturbance caused by charges, between the sensors 112, 114. The resistors R3, R4 in the examples above, may for example be biased half of the time. It is an advantage of embodiments of the present invention that by changing the duty cycle of the supply of one of the sensors, it is possible to change the ratio Sm/Sd of this sensor for sensors where the disturbance is at least partly caused by charges on the sensor.

In embodiments of the present invention the sensor system is configured for swapping the supply voltage of one of the sensors in order to have a different sensitivity Sd, for the disturbance caused by charges or by leakage currents, between the sensors 112, 114.

In embodiments of the present invention the sensor system is configured for having different supply voltages for the at least two sensors 112, 114 in order to have a different sensitivity Sd, for the disturbance caused by leakage currents, between the sensors 112, 114.

The leakage currents may for example be caused by electrostatic discharge (ESD) circuitry which is used for protecting the sensors. This leakage current does not change linearly with the supplied voltage (e.g., due to the PN junction of the ESD protection circuit). Hence, by applying a different voltage for one of the two sensors, this will result in a change of the Sm/Sd ratio of that sensor.

In embodiments of the present invention the sensor system may be configured for changing the supply polarity of one of the pressure sensors. An example thereof is given using the example illustrated in FIG. 9 where a pressure sensor is configured in a Wheatstone bridge configuration. A supply switch unit 115 is configured for connecting the supply voltage to the top node and ground to the bottom node, or vice versa. A readout switch unit 116 is configured for connecting the left node and the right node to the read-out circuitry. These output nodes (the left and right nodes) may be swapped by the readout switch unit.

In embodiments of the present invention the sensor system is configured such that during part of the time the (positive) supply voltage can be connected to the upper node of the bridge and ground to the bottom node and that during part of the time ground is connected to the upper node and supply to the bottom node. The sensor system can do so by controlling the supply switch unit 115.

Swapping the supply polarity also changes the polarity of the sensor bridge output (difference between the 2 middle nodes). In order to avoid this change of polarity, the output nodes may be swapped as well. The sensor system may be configured for doing so by controlling the readout switch unit 116. Alternatively, the controller 120 may be configured for changing the sign of the output signal. This swapping of inputs and outputs is also referred to as chopping.

In embodiments of the present invention ESD protection circuitry may be connected to the sensor assembly. In the example illustrated in FIG. 9 both output nodes (the left and the right node) are connected with ESD protection circuitry 117. This ESD protection circuitry may be part of the sensor assembly (e.g., present at the same die) or it may be external (e.g., connected to an interface) or both. As discussed before ESD protection circuitry typically is a source for leakage currents. In this drawing the leakage will go to ground, so pulling down the sensor nodes. The leakage of both protections in this example will not match well, so they will create a differential signal, which could be seen as a pressure signal.

The differential output voltage created by the leakage will get a different sign when swapping the outputs. The wanted pressure output will however keep the same polarity because the supply and outputs are swapped. In embodiments of the present invention the controller may be configured for averaging the differential output voltage of both phases. Thus, it is possible to obtain a pressure signal without (or heavily reduced) leakage influence. Hence, in this example, by swapping the supply voltage, the sensitivity of one of the sensors to the disturbance is significantly reduced. The disturbance caused by the leakage currents can be monitored by comparing the output signal of this sensor with the output signal of a sensor which does not compensate for the leakage by swapping the supply voltage. The sensor which is compensated for the leakage will have a different Sm/Sd as the non-compensated sensor, since the sensitivity for the disturbance is less for the compensated sensor.

Figure 9:
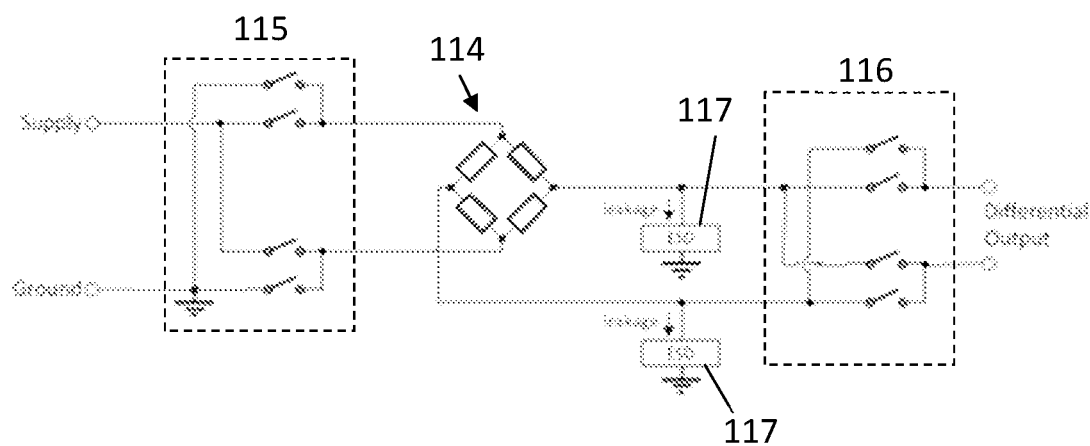
FIG. 9 shows a sensor assembly in which disturbances may occur which can be monitored and/or compensated using a controller, in accordance with embodiments of the present invention.

In the example in FIG. 9 ESD protections are only present at the sensor outputs. The invention is, however, not limited thereto. ESD-protections may also be present at the upper and lower node of the bridge. It is, however, noted that they typically matter less in respect to the leakage currents.

Also, in FIG. 9 the ESD-protection is referred to ground, so in this example only leakage is possible to ground. In general, it does not matter how the ESD protection is connected and how the leakage is flowing, except that it should not be referred to a node which is also swapped together with the bridge. E.g., leakage between the right node and the bottom node of the bridge cannot be compensated by the swapping method.

There could of course also be other leakages than the ones created by the ESD-protection. They can be monitored using the supply swapping method, and will be compensated, as long as the leakage happens in between both pairs of switches (and if the leakage flows to a node that is not changed by the switching).

In embodiments of the present invention the swapping of the voltage supply is, preferably applied to only one of the sensors. The reason therefore being that during the switching it is not possible to do measurements, and as a consequence thereof the sensor system would be blind for a period of time. Furthermore, if capacitors are connected to the sensor (e.g., for EMI reasons), then the settling will take some time, which would increase the blind period even more. This might not be allowable for all sensors simultaneously. Therefore, in embodiments of the present invention the sensor system is configured for having at least one sensor where no swapping of the supply voltage is applied and another sensor where swapping of the supply voltage is applied. The resulting output signal of the latter one may be used to check the plausibility of the output of the first one.

The supply swapping might also be advantageous for the issue of floating charges (mobile ions). If both supply polarities are applied for the same amount of time, then the voltage seen by every resistor is in average the same and equal to 0. So, the drift due to charges will be reduced and very similar for all resistors of the sensor bridge.

Figure 10:
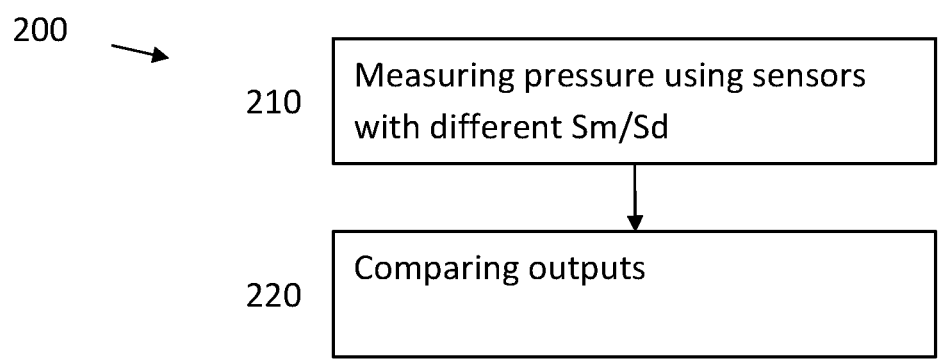
FIG. 10 shows a flow chart of a method in accordance with embodiments of the present invention.

In a third aspect, embodiments of the present invention relate to a method 200 for monitoring disturbances of a sensor assembly. An exemplary flow chart of such a method is illustrated in FIG. 10.

The method comprises:
measuring 210 an output of at least two sensors, wherein the sensors 112, 114 are configured for measuring a pressure and wherein the at least two sensors 112, 114 have a sensor dependent measurement sensitivity Sm for the pressure, and at least one of the sensors 112, 114 is sensitive for a disturbance with a sensor dependent disturbance sensitivity Sd, wherein a ratio Sm/Sd of the measurement sensitivity and the disturbance sensitivity is different for at least two sensors 112, 114,
detecting 220 the disturbance by comparing the output of the at least two sensors.

The invention claimed is:

1. A controller configured for monitoring disturbances of a pressure sensor assembly,
the pressure sensor assembly comprising at least two sensors, wherein the sensors are configured for measuring a pressure and wherein the at least two sensors have a sensor dependent measurement sensitivity for the pressure, and at least one of the sensors is sensitive for a disturbance with a sensor dependent disturbance sensitivity, wherein a ratio of the measurement sensitivity and the disturbance sensitivity is different for at least two sensors,
wherein the controller is configured for detecting the disturbance by comparing outputs of the at least two sensors and the controller is configured for determining the pressure from the outputs of both of the at least two sensors.

2. A sensor system, for measuring a pressure, the sensor system comprising
a pressure sensor assembly comprising at least two sensors, wherein the sensors are configured for measuring the pressure and wherein each sensor has a sensor dependent measurement sensitivity for the pressure, and at least one of the sensors is sensitive for a disturbance with a sensor dependent disturbance sensitivity, wherein a ratio of the measurement sensitivity and the disturbance sensitivity is different for at least two sensors,
a controller according to claim 1 configured for monitoring disturbances of the pressure sensor assembly.

3. The sensor system according to claim 2, wherein the sensors are made on a same substrate.

4. The sensor system according to claim 2, wherein the sensors are using the same sensing principle.

5. The sensor system according to claim 2, wherein the sensors have a different sensitivity for the pressure.

6. The sensor system according to claim 2, wherein at least one sensor is insensitive to the disturbance.

7. The sensor system according to claim 2, wherein the disturbance is caused by mechanical stress.

8. The sensor system according to claim 2, wherein the disturbance is caused by charges in the pressure sensor assembly or by leakage currents through the pressure sensor assembly.

9. The sensor system according to claim 8, wherein the sensor system is configured for having different supply voltages for the at least two sensors.

10. The sensor system according to claim 8, wherein the sensor system is configured for applying a supply voltage only part of the time for at least one of the two sensors such that the supply duration during which a voltage is applied is different for the at least two sensors.

11. The sensor system according to claim 2, wherein the sensor system is configured for swapping the supply voltage of at least one of the sensors.

12. The sensor system according to claim 2, wherein the sensors are provided on one or more membranes.

13. The sensor system according to claim 2, wherein the sensors are piezo-resistors.

14. The sensor system according to claim 2, wherein the sensors comprise strain gauges.

15. A method for monitoring disturbances of a sensor assembly, the method comprising:
- measuring an output of at least two sensors, wherein the sensors are configured for measuring a pressure and wherein the at least two sensors have a sensor dependent measurement sensitivity for the pressure, and at least one of the sensors is sensitive for a disturbance with a sensor dependent disturbance sensitivity:
- wherein a ratio of the measurement sensitivity and the disturbance sensitivity is different for at least two sensors;
- detecting the disturbance by comparing the output of the at least two sensors and determining the pressure from the outputs of both of the at least two sensors.

* * * * *